United States Patent
Pieussergues et al.

(10) Patent No.: US 8,763,406 B2
(45) Date of Patent: Jul. 1, 2014

(54) TURBOMACHINE COMBUSTION CHAMBER

(75) Inventors: Christophe Pieussergues, Nangis (FR); Denis Jean Maurice Sandelis, Nangis (FR)

(73) Assignee: Snecma, Paris (FR)

( * ) Notice: Subject to any disclaimer, the term of this patent is extended or adjusted under 35 U.S.C. 154(b) by 982 days.

(21) Appl. No.: 12/918,946

(22) PCT Filed: Mar. 6, 2009

(86) PCT No.: PCT/FR2009/000237
§ 371 (c)(1),
(2), (4) Date: Aug. 23, 2010

(87) PCT Pub. No.: WO2009/118478
PCT Pub. Date: Oct. 1, 2009

(65) Prior Publication Data
US 2010/0326078 A1     Dec. 30, 2010

(30) Foreign Application Priority Data

Mar. 19, 2008   (FR) ...................................... 08 01503

(51) Int. Cl.
*F02C 7/20*      (2006.01)

(52) U.S. Cl.
USPC .............................................. 60/800; 60/756

(58) Field of Classification Search
USPC ............................. 60/800, 798, 796, 748, 756
See application file for complete search history.

(56) References Cited

U.S. PATENT DOCUMENTS

| 3,385,055 A | * | 5/1968 | Koblish et al. | 60/748 |
| 4,914,918 A | * | 4/1990 | Sullivan | 60/756 |
| 4,999,996 A | | 3/1991 | Duchene et al. | |
| 5,291,733 A | * | 3/1994 | Halila | 60/796 |
| 6,581,386 B2 | * | 6/2003 | Young et al. | 60/748 |
| 2003/0061815 A1 | | 4/2003 | Young et al. | |
| 2004/0143967 A1 | | 7/2004 | Caldwell et al. | |

FOREIGN PATENT DOCUMENTS

| EP | 1 443 274 | 8/2004 |
| FR | 2 639 095 | 5/1990 |

* cited by examiner

*Primary Examiner* — Andrew Nguyen
(74) *Attorney, Agent, or Firm* — Oblon, Spivak, McClelland, Maier & Neustadt, L.L.P.

(57) ABSTRACT

A turbomachine combustion chamber in which a chamber end wall presents an opening for receiving a pre-vaporization bowl, and including a device for injecting air and fuel mounted on the axis thereof, the bowl being floatingly mounted relative to the chamber end wall to move in a predetermined radial direction and flaring downstream so as to form a collar, a deflector forming a thermal shield being made integrally with the bowl beside the chamber end wall so that the floating movement of the bowl-and-deflector assembly takes place in a sliding plane situated between the deflector and the chamber end wall.

12 Claims, 2 Drawing Sheets

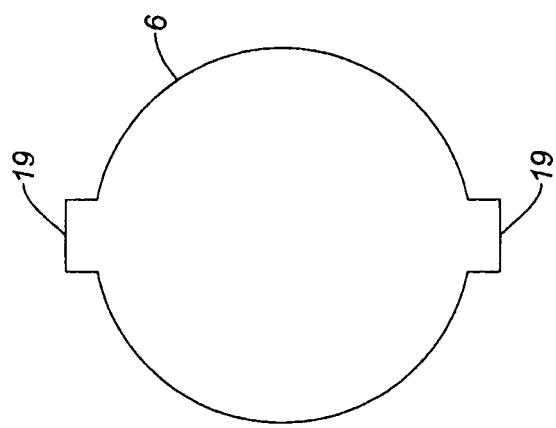
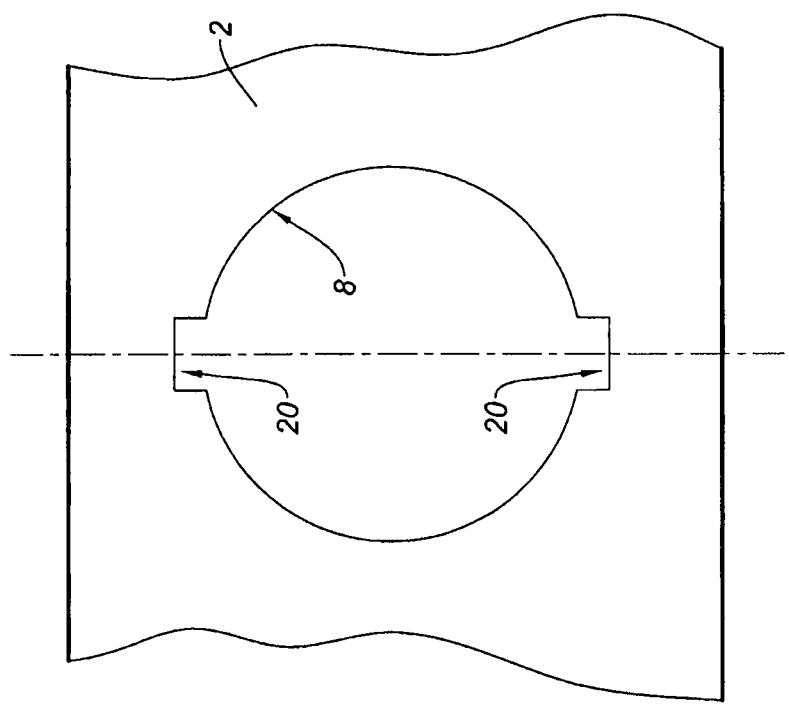

TURBOMACHINE COMBUSTION CHAMBER

BACKGROUND OF THE INVENTION

1. Field of the Invention

The present invention relates to the field of turbomachines and more particularly to a turbomachine combustion chamber.

2. Description of the Related Art

In the description below, the terms "upstream" and "downstream" are used to designate the positions of structural elements relative to one another in an axial direction, taking the gas flow direction as a reference. Similarly, the terms "inner" or "radially inner" and "outer" or "radially outer" are used to designate the positions of structural elements relative to one another in a radial direction, using the axis of symmetry of the structure in question as a reference.

A turbomachine comprises one or more compressors delivering air under pressure to a combustion chamber where the air is mixed with fuel and ignited so as to generate hot combustion gas. This gas flows downstream from the chamber towards one or more turbines that transform the energy received in this way so as to drive the compressor(s) in rotation and also provide the work that is needed, e.g. for powering an airplane.

Typically, an annular combustion chamber used in aviation comprises inner and outer longitudinal walls forming surfaces of revolution that are connected together at their upstream ends by an annular transverse wall referred to as the chamber end wall. The chamber end wall has a plurality of circumferentially spaced-apart openings, each receiving an injector device having an injector positioned in the middle thereof, the end wall and the injector together enabling the mixture of air and fuel to be delivered for being burnt in the combustion chamber.

The combustion chamber is fed with liquid fuel mixed with air coming from a compressor. The liquid fuel is taken to the combustion chamber by injectors in which it is vaporized into fine droplets. Vaporization is initiated in the injectors by means of nozzles and it continues in a Venturi and a pre-vaporization bowl under the effect of the air under pressure coming from a compressor. This air under pressure passes firstly through radial swirlers of the injector device in order to set the fuel sprayed by the injector into rotation, and secondly through orifices formed in various portions of the injector device, such as the bowl.

The bowl flares downstream so as to form a collar, and a deflector is placed around the collar of the bowl on the downstream side of the chamber end wall. The deflector forms a heat shield and it is cooled by the impact of cooling air coming from a plurality of perforations formed through the chamber end wall.

Examples of such turbomachine combustion chambers are described in patents FR 2 662 784 and FR 2 639 095 in the name of the Applicant.

The bowl is floatingly mounted therein to move in translation relative to the chamber end wall and to the deflector along a predetermined radial direction. Means are provided for guiding movement of the bowl in translation in the predetermined radial direction.

This configuration serves in operation to absorb the relative movements between the walls of the combustion chamber and the injector, which movements are due to thermal expansion differences between the chamber and the casing of the turbomachine.

Unfortunately, the collar of the bowl runs the risk of deforming as a result of the high temperatures that are reached in this region of the combustion chamber, such that the radial clearance that is needed between the bowl and the deflector can be disturbed and such that the injector can be moved off-center relative to the bowl, which leads to undesirable rotation of the sheet of fuel sprayed by the injector.

BRIEF SUMMARY OF THE INVENTION

The present invention seeks to remedy this drawback by means of a turbomachine combustion chamber as described above in which the radial clearance needed between the bowl and the chamber end wall is preserved in spite of the high temperatures reached in the region of the chamber end wall.

To this end, the invention provides a turbomachine combustion chamber of the type described in the introduction, wherein the bowl and the deflector are made as a single piece, and the floating movement of the bowl-and-deflector assembly takes place in a sliding plane situated between the deflector and the chamber end wall.

Since the sliding plane is situated between the deflector and the chamber end wall, any deformation of the collar of the bowl has no impact on the radial floating movement of the bowl-and-deflector assembly that is needed to track possible movements of the injector head. Furthermore, this sliding plane is relatively cool compared with the remainder of the combustion chamber, thereby preserving the radial clearance of the bowl-and-deflector assembly relative to the chamber end wall in the event of high temperatures existing in the chamber.

According to an advantageous characteristic of the invention, the bowl-and-deflector assembly is made of a ceramic matrix composite material, so as to limit the weight that is cantilevered out from the injector.

In order to further minimize any risk of disturbing the radial clearance of the bowl-and-deflector assembly, the deflector may present a general shape that is substantially plane extending parallel to the chamber end wall and may be separated by an empty annular space from at least one wall of the combustion chamber.

Advantageously, at least one cooling orifice is arranged in the chamber end wall in register with said empty annular space between the deflector and the wall of the combustion chamber.

In a simple embodiment of the invention, said means for guiding the movement of the bowl in translation comprise a threaded portion provided around the bowl and designed to receive a retaining nut bearing against the chamber end wall, said nut being screwed so as to leave the bowl-and-deflector assembly free to float in translation in said predetermined radial direction, and means are provided for preventing the nut from loosening off said threaded portion.

Said means for preventing the nut from loosening may comprise a plurality of through holes formed radially through the nut and suitable for coinciding with orifices formed radially through the threaded portion, the through holes and the orifices being designed, on coinciding, to receive a blocking pin.

According to another characteristic, complementary shape means are also provided to prevent rotation between the chamber end wall and the bowl-and-deflector assembly.

The present invention also provides a turbomachine including a combustion chamber as defined above.

Particular advantages of the present invention include ensuring stable behavior for the sheet of sprayed fuel, limiting the number of parts in the end of the chamber, and reducing the weight of the combustion chamber.

BRIEF DESCRIPTION OF THE SEVERAL VIEWS OF THE DRAWINGS

The invention can be better understood and other characteristics, details, and advantages thereof appear more clearly in the light of the following description of a preferred embodiment given by way of non-limiting example and made with reference to the accompanying drawings, in which:

FIGS. 3 and 4 are two analogous section views on line III-III of FIG. 1 showing complementary means for preventing rotation between the end of the chamber (in FIG. 3) and the bowl-and-deflector assembly (in FIG. 4).

DETAILED DESCRIPTION OF THE INVENTION

Figure 1:
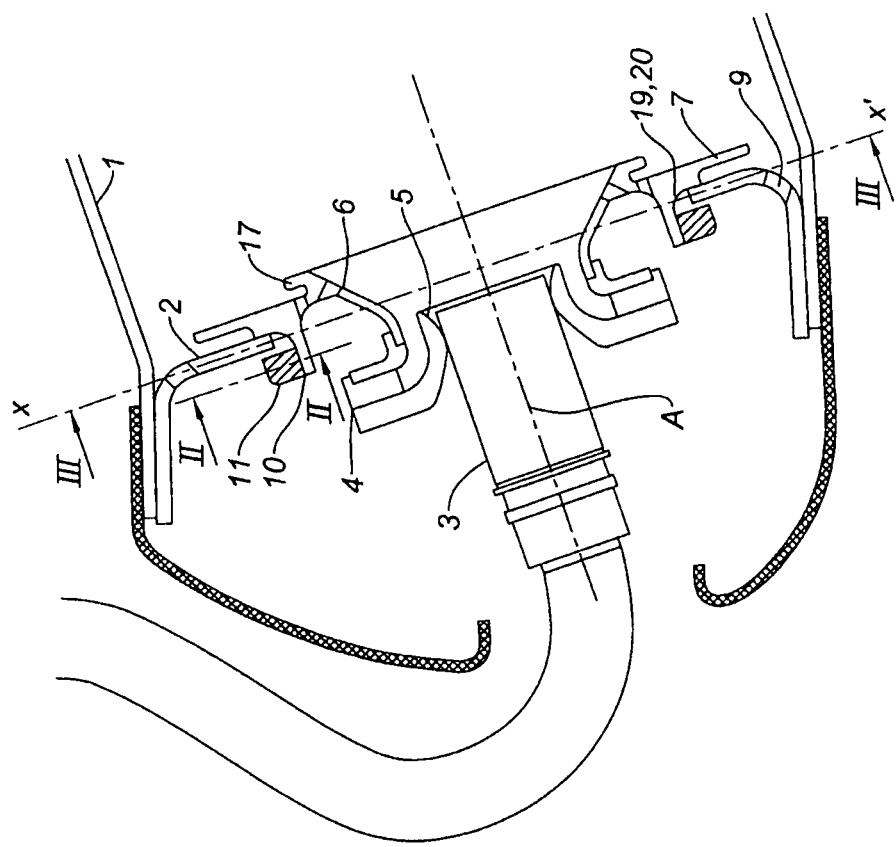
FIG. 1 is a fragmentary longitudinal section view of a combustion chamber of the invention, and more particularly it shows the region at the end of the chamber.

FIG. 1 shows a turbomachine combustion chamber of the invention, having an outer longitudinal wall 1 and an inner longitudinal wall, both forming surfaces of revolution, and interconnected at their upstream ends by an annular transverse wall 2 referred to as the chamber end wall.

The chamber end wall 2 presents a plurality of openings 8 that are circumferentially spaced apart, each receiving an injector device having in the middle thereof an injector 3, the end wall and the injector together enabling the mixture of air and fuel to be delivered for being burnt in the combustion chamber.

The combustion chamber is fed with liquid fuel mixed with air that is taken to the chamber by the injectors 3 in which it is vaporized into fine droplets. This vaporization is initiated in the injectors 3 by means of nozzles and it continues in a Venturi 5 and a pre-vaporization bowl 6 of generally annular shape under the effect of air under pressure coming from a compressor (not shown). The injector device is mounted on the axis A of the bowl 6. The air under pressure passes through radial swirlers 4 of the injector device in order to set the fuel that has been sprayed by the injector 3 into rotation.

The bowl 6 flares downstream so as to form a collar 17, a deflector 7 that forms a heat shield being disposed around the collar 17 of the bowl 6 on a downstream side of the chamber end wall 2.

The bowl 6 is floatingly mounted relative to the chamber end wall 2 to move in a predetermined radial direction XX', and guide means 10-14 (described below) are provided for guiding movement of the bowl 6 in translation along the direction XX'.

According to the invention, bowl 6 and the deflector 7 constitute a single part that is made in this example out of a ceramic matrix composite material.

Thus, the floating movement (i.e. radial clearance in the direction XX') of the assembly comprising the bowl 6 and the deflector 7 takes place in a sliding plane that is situated between the deflector 7 and the chamber end wall 2. With high temperatures in the combustion chamber, the sliding plane situated between the deflector and the chamber end wall remains relatively cool (compared with the remainder of the combustion chamber), thereby preserving the radial clearance for the bowl-and-deflector assembly 6, 7 that is necessary to enable it to track possible movements of the injector head 3.

In this example, the deflector 7 has a substantially plane general shape extending parallel to the chamber end wall 2 so as to further minimize any risk of disturbing the radial clearance for the bowl-and-deflector assembly 6, 7.

The ring of the deflector 7 is surrounded by an annular space that is empty relative to the chamber walls so as to avoid impeding radial movement of the bowl-and-deflector assembly 6, 7.

A plurality of regularly spaced-apart cooling orifices 9 are formed through the chamber end wall 2, facing the empty annular space between the deflector 7 and the walls of the combustion chamber.

The means implemented for guiding movement of the bowl 6 in translation comprise a threaded surface 10 formed radially on the outside over the periphery of the bowl 6 so as to receive a screw-on nut 11 that forms retaining means against the chamber end wall 2.

The nut 11 is screwed onto the bowl 6 so as to leave the bowl-and-deflector assembly 6, 7 free to float in translation in the predetermined radial direction XX'.

Figure 2:
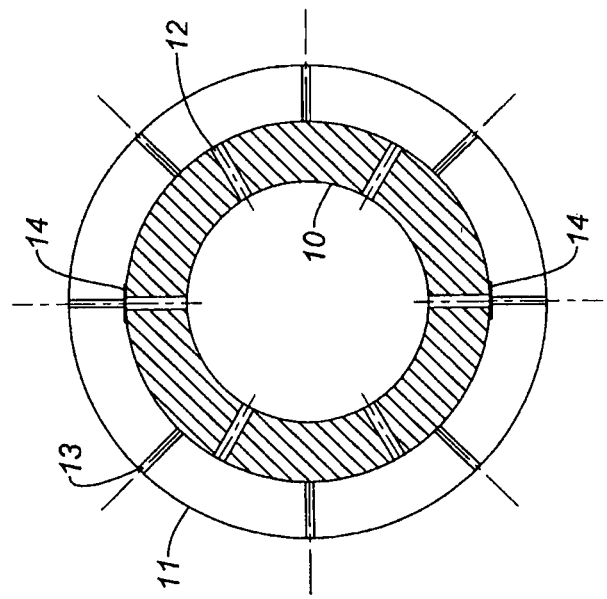
FIG. 2 is a section view on II-II of FIG. 1 and shows means for guiding movement of the bowl in translation.

Means shown in FIG. 2 are provided for preventing the nut 11 from loosening relative to the threaded surface 10.

In the embodiment shown, the anti-loosening means comprise eight through holes 13 formed radially in the nut 11 and each suitable, depending on the angular position of the nut 11, for coinciding with one of six orifices 12 formed radially through the threaded surface 10. These through holes 13 and orifices 12 are designed, on coinciding in alignment, for receiving a blocking pin 14.

The assembly is mounted as follows.

The bowl-and-deflector assembly 6, 7 is initially mounted free on the chamber end wall 2 and a nut 11 is screwed onto the threaded surface 10 of the loose bowl-and-deflector assembly 6, 7.

Thereafter, the nut 11 is tightened manually until it comes into contact with the chamber end wall 2 and is then loosened so that a hole 13 of the nut 11 coincides with an orifice 12 in the threaded surface 10 and so that the necessary radial clearance is indeed provided between the bowl-and-deflector assembly 6, 7 and the chamber end wall 2.

In this example, the locking pin 14 is a rivet that is inserted through the hole 13 and the orifice 12 that are in coincidence, and finally the rivet is brazed. This disposition prevents the nut 11 from loosening.

FIGS. 3 and 4 show means of complementary shape for preventing rotation between an opening 8 in the chamber end wall 2 and the corresponding bowl-and-deflector assembly 6, 7. In this example, the bowl-and-deflector assembly 6, 7 has two anti-rotation pegs 19 on its periphery (see FIG. 3) that project radially outwards in diametrically opposite positions. These two pegs 19 are designed to be received in respective notches 20 (see FIG. 4) that project radially outwards and that are formed in the wall of the opening 8 in the chamber end wall 2.

Naturally, and as can be seen from the above, the invention is not limited to the single embodiment described above; on the contrary, it covers any embodiment and application variants that come within the scope of the following claims. Thus, in particular, it would not go beyond the ambit of the invention for the bowl and the deflector to be made as a single casting, for example.

The invention claimed is:

1. A turbomachine combustion chamber comprising: at an upstream end relative to a gas flow direction, a chamber end wall presenting an opening;

a pre-vaporization bowl received in said opening, the pre-vaporization bowl which has an axis and a generally annular shape being floatingly mounted relative to the chamber end wall to move in a predetermined radial direction and being flared downstream so as to form a collar, the collar having a periphery;

an air and fuel injector device mounted on the axis of said pre-vaporization bowl; a deflector forming a heat shield being situated around the collar of the bowl on a downstream side of the chamber end wall; and guiding means for guiding movement of the bowl in translation along the predetermined radial direction, wherein the bowl and the deflector are made as a single piece, and the floating movement of the bowl-and-deflector assembly takes place in a sliding plane situated between the deflector and the chamber end wall, wherein the guiding means comprises a threaded portion provided around the bowl to receive a retaining nut bearing against the chamber end wall, the nut being screwed so as to leave the bowl-and-deflector assembly free to float in translation in the predetermined radial direction.

2. A combustion chamber according to claim 1, wherein the bowl-and-deflector assembly is made of a ceramic matrix composite material.

3. A combustion chamber according to claim 1, wherein the deflector presents a substantially plane general shape extending parallel to the chamber end wall and is separated by an empty annular space from at least one wall of the combustion chamber.

4. A combustion chamber according to claim 3, wherein at least one cooling orifice is formed in the chamber end wall in register with the empty annular space between the deflector and the combustion chamber wall.

5. A combustion chamber according to claim 1, further comprising means for preventing the nut from loosening.

6. A combustion chamber according to claim 5, wherein the means for preventing the nut from loosening comprises a plurality of through holes formed radially through the nut and configured to coincide with orifices formed radially through the threaded portion, the through holes and the orifices being configured, on coinciding, to receive a blocking pin.

7. A combustion chamber according to claim 1, further comprising anti-rotation means of complementary shapes for preventing rotation between the chamber end wall and the bowl-and-deflector assembly.

8. A turbomachine, comprising a combustion chamber according to claim 1.

9. A combustion chamber according to claim 1, wherein said guiding means is fixed to the bowl-and-deflector assembly so as to leave said bowl-and-deflector assembly free to float in translation in the predetermined radial direction, and wherein an inner peripheral zone of the chamber end wall is interposed between said fixed guiding means and a portion of a peripheral zone of the deflector.

10. A turbomachine combustion chamber comprising:
at an upstream end relative to a gas flow direction, a chamber end wall presenting an opening;
a pre-vaporization bowl received in said opening, the pre-vaporization bowl which has an axis and generally annular shape being floatingly mounted relative to the chamber end wall to move in a predetermined radial direction and being flared downstream so as to form a collar, the collar having a periphery;
an air and fuel injector device mounted on the axis of said pre-vaporization bowl;
a deflector forming a heat shield being situated around the collar of the bowl on a downstream side of the chamber end wall; and
guiding means for guiding movement of the bowl in translation along the predetermined radial direction,
wherein the bowl and the deflector are made as a single piece, and the floating movement of the bowl-and-deflector assembly takes place in a sliding plane situated between the deflector and the chamber end wall, and
wherein the deflector presents a substantially plane general shape extending parallel to the chamber end wall and is separated by an empty annular space from at least one wall of the combustion chamber.

11. A combustion chamber according to claim 10, wherein said guiding means comprises a threaded portion provided around the bowl to receive a retaining nut bearing against the chamber end wall, the nut being screwed so as to leave the bowl-and-deflector assembly free to float in translation in the predetermined radial direction and is fixed to the bowl-and-deflector assembly so as to leave said bowl-and-deflector assembly free to float in translation in the predetermined radial direction, wherein the deflector has a peripheral zone extending radially beyond the periphery of the collar,
wherein said guiding means comprises a portion of said peripheral zone of the deflector, and
wherein an inner peripheral zone of the chamber end wall is interposed between said fixed guiding means and said portion of the peripheral zone of the deflector.

12. A combustion chamber according to claim 10, wherein the guiding means comprises a threaded portion provided around the bowl to receive a retaining nut bearing against the chamber end wall, the nut being screwed so as to leave the bowl-and-deflector assembly free to float in translation in the predetermined radial direction.

\* \* \* \* \*